United States Patent
Baty et al.

[11] Patent Number: 5,576,756
[45] Date of Patent: Nov. 19, 1996

[54] ELECTRICAL NETWORKS FOR EMULATING THE RESPONSE OR CO-AXIAL TRANSMISSION CABLE TO SERIAL DIGITAL VIDEO SIGNALS

[75] Inventors: David C. Baty, Stoke-on-Trent; Barry D. R. Miles, Newbury, all of Great Britain

[73] Assignee: Faraday Technology Limited, United Kingdom

[21] Appl. No.: 162,183

[22] PCT Filed: Apr. 13, 1993

[86] PCT No.: PCT/GB93/00768

§ 371 Date: Jan. 13, 1994

§ 102(e) Date: Jan. 13, 1994

[87] PCT Pub. No.: WO93/21696

PCT Pub. Date: Oct. 28, 1993

[30] Foreign Application Priority Data

Apr. 13, 1992 [GB] United Kingdom ............... 9208087

[51] Int. Cl.⁶ ............... H04N 17/00; H04R 3/40
[52] U.S. Cl. ............. 348/192; 333/156; 333/170
[58] Field of Search .............. 348/180, 192; 333/156, 167, 170; 324/534; 455/67.1, 67.4; H04B 3/40; H04N 17/00

[56] References Cited

U.S. PATENT DOCUMENTS

| | | | |
|---|---|---|---|
| 2,315,784 | 4/1993 | Goodala | 348/192 |
| 3,244,975 | 4/1996 | Bauer | 324/534 |
| 3,781,722 | 12/1973 | Pierson | 333/156 |
| 4,885,562 | 12/1984 | Duvrard et al. | 333/170 |
| 5,307,031 | 4/1994 | Dick | 333/156 |

FOREIGN PATENT DOCUMENTS

| | | | |
|---|---|---|---|
| 0073884 | 6/1982 | European Pat. Off. | H04B 3/14 |
| 1922455 | 5/1969 | Germany | H04B 3/40 |
| 3303626 | 2/1983 | Germany | H04B 3/40 |
| 57-104338 | 6/1982 | Japan | H04B 5/40 |
| 57-104388 | 6/1982 | Japan | H04B 3/40 |
| 1522100 | 11/1923 | United Kingdom | H03H 7/08 |
| 2000933 | 7/1978 | United Kingdom | H04B 3/14 |
| 9301661 | 1/1993 | WIPO | H04B 3/40 |

OTHER PUBLICATIONS

J. Salzmann, "Cables et transmission", Oct. 1973, pp. 466–468.
Stephan Meyer, Leitungsnachbildung am ISDN–$S_o$–Basisanschluss Feb. (1992) pp. 102–103 with transister.
Jean Salzmann, Note sur la Simulation de l'Affaiblissement d'un Cable Par un Reseau, pp. 466–468 with translation.

Primary Examiner—John K. Peng
Assistant Examiner—Jeffrey A. Murell
Attorney, Agent, or Firm—Skjerven, Morrill, MacPherson, Franklin & Friel; Alan H. MacPherson; E. Eric Hoffman

[57] ABSTRACT

An electrical network emulates the transmission characteristics of a video signal cable, allowing tests to be made as to the length to which the cable may be extended before video signal degradation occurs. The preferred embodiment emulates a Beldon® 8281 coaxial cable, used for the transmission of serial digital video signals, and comprises four sections. The sections are arranged to emulate cable lengths of 25 meters, 50 meters and 200 meters.

19 Claims, 4 Drawing Sheets

ELECTRICAL NETWORKS FOR EMULATING THE RESPONSE OR CO-AXIAL TRANSMISSION CABLE TO SERIAL DIGITAL VIDEO SIGNALS

FIELD OF THE INVENTION

The present invention relates to an electrical network and a method of testing the length of cable over which a signal may be transmitted.

BACKGROUND OF THE INVENTION

Many transmission standards are known for transmitting signals over cables. Some of these standards allow signals to be transmitted over very large distances, for example such as those employed in telephony. Many of these transmission standards involve the modulation of signals, so as to present a modulated signal to the transmission medium which can be transmitted over much longer distances through said medium.

Over shorter lengths, for example, within a building or data processing facility, it is desirable to transmit signals in an unmodulated form, thereby avoiding the need for a multiplicity of modulating and demodulating devices. However, in this form, signal degradation is more likely to occur, as the lengths of cable increase until a critical point is reached at which the cable is too long for the signal to be transmitted.

In such an environment, a common problem for technicians and engineers is that of determining the extent to which a cable may be extended before critical degradation does occur. A known technique for making this assessment consists of inserting lengths of cable into the circuit and assessing whether the equipment continues to function correctly with said additional length in place. A major problem with this approach is that even a relatively short additional length of cable can be quite heavy and bulky and to perform a suitable test, it may be necessary to connect several different lengths of cable. Thus, the problem is not essentially one of determining how the test may be performed but of physically implementing the test, given that cables may be less than perfectly accessible and the space available for making such tests may be limited.

An environment where such a problem often occurs is in a television studio or video editing facility, in which digital video signals and, more recently, serial digital video signals, are transmitted between various processing devices, such as editing desks, recording equipment and effects machines etc.

In accordance with the CCIR 601 standard, 10 bit parallel data may be converted to a serial bit stream consisting of 270 megabits per second transmitted by scrambling the information in accordance with an non-return to zero algorithm. Alternatively, composite video in NTSC or PAL format, may be transmitted in accordance with the D2 standard at 144 megabits per second or 177 megabits per second respectively.

As previously stated, the transmission of such signals over physical cables will result in signal attenuation and the level of attenuation will depend upon the quality of the cable and its length. However, the level of attenuation and signal delay also varies with the transmission frequency of the signal and, being digital in nature, the transmitted waveform will be made up of a plurality of different frequency components. Thus, these frequency components will tend to be attenuated and delayed by differing amounts, resulting in signal distortion.

Being a digital signal, the degree of attenuation and distortion introduced by the cable will not result in appreciable signal degradation until a certain level has been attained, whereafter, the degradation becomes unacceptable and the resulting noise introduced to the signal results in an unacceptable number of errors being introduced.

Thus, in assessing the extent to which the length of the cable may be increased, it is necessary to keep adding different lengths of cable and then determine whether an acceptable or an unacceptable level of degradation is occurs.

SUMMARY OF THE INVENTION

According to a first aspect of the present invention, there is provided an electrical network, characterised by being configured to have a frequency response over a frequency range of interest substantially similar to the frequency response of a predetermined length of cable, wherein said network emulates the transmission characteristics of said cable.

Thus, the present invention provides a solution to the problem of increasing cable lengths for testing purposes. Rather than actually introducing a physical length of cable, the network emulates the transmission characteristics of the cable, thereby allowing tests to be made without introducing additional lengths of physical cable.

In a preferred embodiment, the network emulates the characteristics of cable when transmitting coded digital signals. Thus, the emulation bandwidth may be limited to take account of redundancy in the transmitted signal, particularly when coded algorithms are being employed.

In a preferred embodiment, the network emulates the response of cable at frequencies associated with the transmission of serial digital video signals. Preferably, processing means are provided for assessing the integrity of the serial digital video signal after transmission.

According to a second aspect of the present invention, there is provided a method of testing the length of cable over which a signal may be transmitted, comprising the steps of assessing the level of degradation to the signal after transmission, characterized by applying said signal to an electrical network configured to have a frequency response, over a frequency range of interest, substantially similar to the frequency response of a predetermined length of cable, wherein said network emulates the transmission characteristics of said cable.

DETAILED DESCRIPTION OF THE PREFERRED EMBODIMENTS

The preferred embodiments are networks, passive or active, for emulating the response of lengths of cable over a frequency range of interest. The networks may have many applications but are particularly directed towards testing system, in that, an evaluation can be made as to the response of the system when an additional cable length has been inserted. The preferred embodiments will be described with reference to the transmission of serial digital video signals and, in particular, signals conforming to the CCIR 601 standard but it should be appreciated that similar techniques may be employed for emulating the transmission of any signal over any transmission medium.

Figure 1:
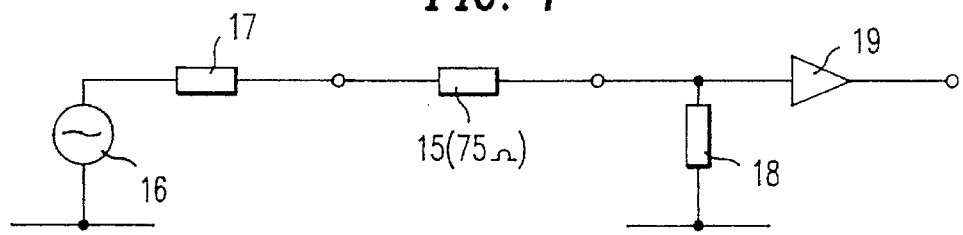
FIG. 1 shows a model of a digital serial video transmission system.

A serial digital video transmission system is shown in FIG. 1, in which a transmission cable is modelled by a network 15, having a characteristic impedance of 75 ohms. A transmitter consists of a signal source 16, having an internal impedance 17 matched to the characteristic impedance on the cable 15. At the receiver, the cable is terminated by an impedance 18, equal to the characteristic impedance of the cable, along with an equaliser 19. The purpose of the equaliser 19 is to compensate for the attenuation introduced to the signal by the cable 15, the level of attenuation being frequency dependent.

Several standards exist for transmitting serial digital video data, which vary depending upon the nature of the data being conveyed. For top quality professional applications, video data may be conveyed in accordance with the CCIR 601 standard, using the 10 bit parallel configuration clocked at 27 megahertz. Alternatively, D1 data of this type may be transmitted in serial form, in which the data is scrambled in accordance with a non return to zero algorithm and transmitted at 270 megabits per second.

The non return to zero algorithm results in a waveform in which a logical "1" is transmitted by a signal transition. Theoretically, therefore, the highest frequency component which needs to be transmitted is 135 megahertz, which occurs when two data transitions are conveyed within one cycle of the waveform. However, in practice, frequency components higher than 135 megahertz may be carried, including components up to 300 megahertz.

Figure 2:
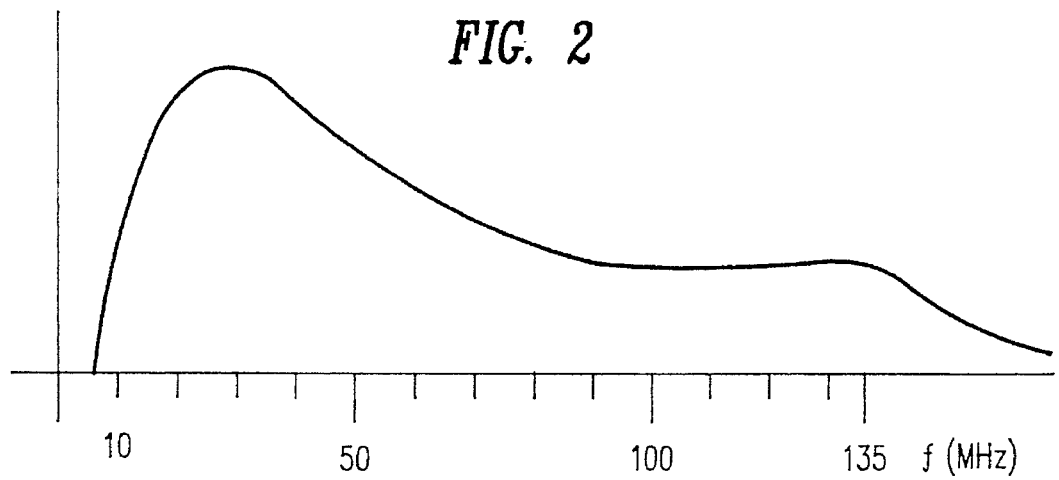
FIG. 2 shows the energy distribution of a serial digital video signal plotted against frequency.

The energy distribution of a typical serial digital video signal, plotted against frequency, is shown in FIG. 2. No appreciable energy is conveyed from DC to about ten megahertz and the information of interest is conveyed over the range of ten megahertz to 135 megahertz. In the theoretical model, no energy should exist at the Nyquist frequency of 135 megahertz although, in practice, components do exist at this frequency and beyond.

Figure 3:
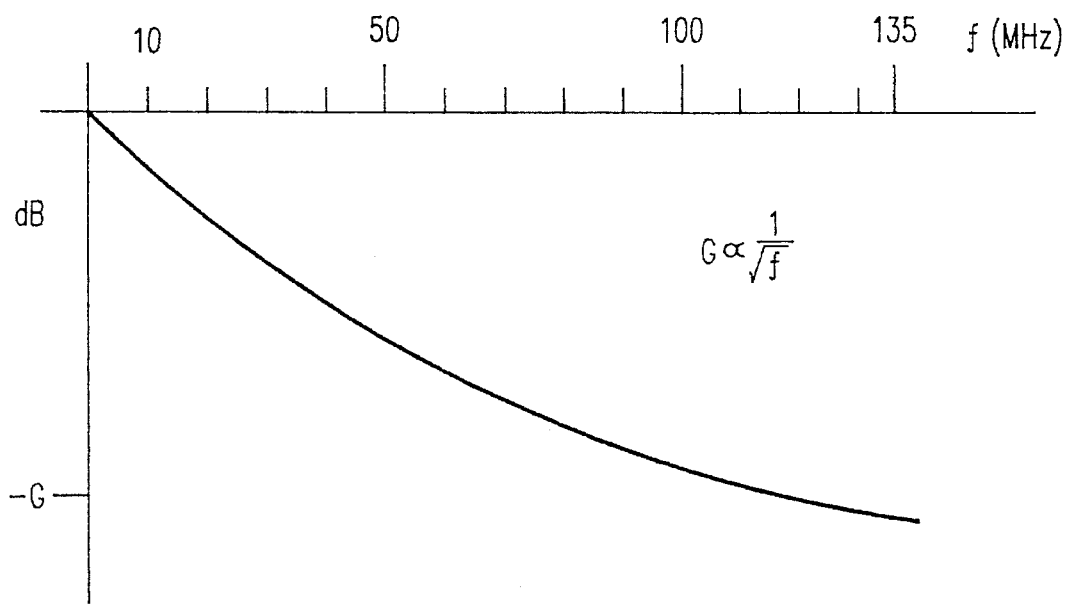
FIG. 3 shows the attenuation of a typical unit length of coaxial cable for transmitting serial digital video signals, plotted against frequency.

A typical frequency response curve for coaxial cable, suitable for transmitting serial digital video signals, is shown in FIG. 3, in which gain is plotted against a frequency axis, which shares a frequency scale with the similar axis of FIG. 2. The cable introduces attenuation, therefore the gain is negative.

It can be seen from FIG. 3 that a simple resistive model of the cable is inappropriate because the gain, measured in decibels, varies in proportion to the reciprocal of the square root of the applied frequency. Thus, a preferred embodiment of the present invention is directed towards emulating this response.

Preferred embodiments of the invention will be configured so as to emulate particular types of cable. It is expected that particular embodiments will, therefore, be directed towards very specific applications, so as to provide accurate results in specific working environments.

As previously stated, a preferred embodiment is directed towards emulating coaxial cable used for transmitting serial digital video signals. Thus, the networks will be particularly directed towards the type of cable used and the nature of the signals transmitted over the cables.

A first preferred embodiment is directed towards emulating a 25 meters length of Beldon 8281 coaxial cable, used for transmitting serial digital video signals.

Figure 4:
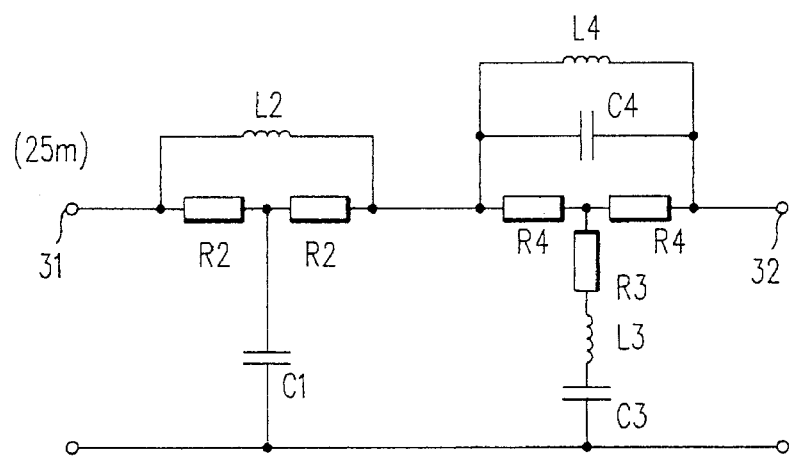
FIG. 4 shows a network for emulating 25 meters of coaxial cable.

As shown in FIG. 4 an input port 31 is serially connected to two resistors R2 each of 75 ohms, which are in turn serially connected to resistors R4 of 5.1 ohms. An inductor L2 of 27.39 nanoHenrys (nH, H times 10 to the minus 9) is connected in parallel with resistors R2. A capacitor C1 of 4.869 picoFarads (pF, F times 10 to the minus 12) bridges the mutual connection of resistors R2 to ground. An inductor L4 of 39.21 nH and a capacitor C4 of 20.67 pF are both connected in parallel with both serial resistors R4. Serial connection of a resistor R3 of 510 ohms, an inductor L3 of 16.3 nH and a capacitor C3 of 6.971 pF bridge the mutual connection between resistors R4 to ground.

Figure 5:
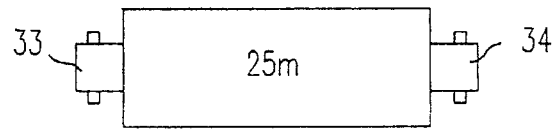
FIG. 5 shows a housing for the network shown in FIG. 4.

The network shown in FIG. 4 is mounted within a conductive housing of the type shown in FIG. 5. Input terminal 31 is connected to an input BNC connector 33 and, similarly, output terminal 32 is connected to a similar output BNC connector 34. Thus, the network, which emulates a 25 meter length of cable, may be connected in line with existing cable using BNC connectors, as commonly used in the art.

Figure 6:
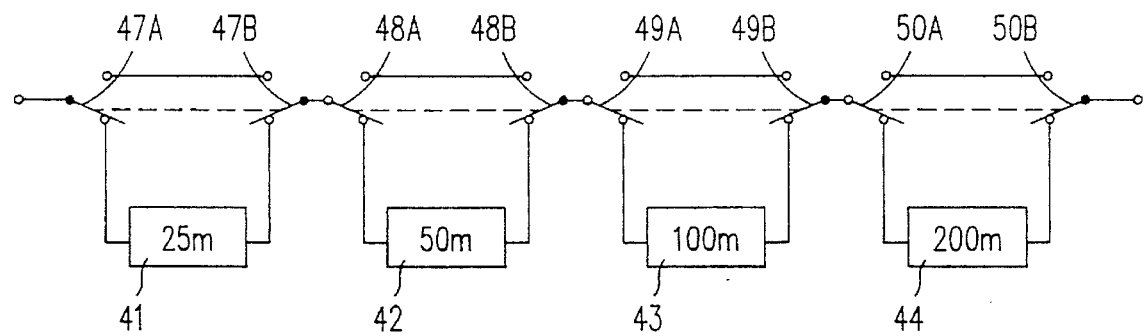
FIG. 6 shows a cascade of network stages.

A second preferred embodiment is shown in FIG. 6, in which a plurality of networks may be selectively connected in cascade. A first network 41 is equivalent to the network shown in FIG. 4 and introduces an attenuation equivalent to a 25 meters length of the cable. Similarly, network 42 introduces an attenuation equivalent to 50 meters, network 43 introduces an attenuation equivalent to 100 meters, while network 44 introduces an attenuation equivalent to 200 meters of the particular cable under consideration. Furthermore, each network may be independently selected by the operation of a respective double poled double throw switch.

Figure 7:
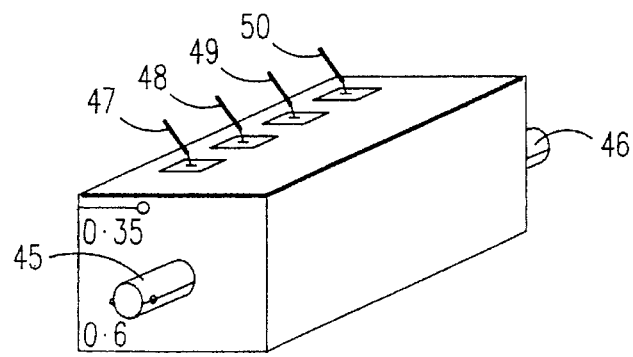
FIG. 7 shows a housing for the network stages shown in FIG. 6.

A mounting box for the cascade of filters is shown in FIG. 7, in which a BNC connector 45 provides an input to the network and an output is provided by a similar connector 46. Extending from the box are toggles 47, 48, 49 and 50 for four double poled double throw switches. Thus, toggle 47 operates ganged switches 47A and 47B in FIG. 6, thereby introducing network 41 to the cascade. Similarly, toggle 48 operates gang switches 48A and 48B placing network 42 in series with the input and output connectors 45 and 46, while toggles 49 and 50 are similarly connected to gang switches 49A, 49B and switches 50A, 50B, cascading networks 43 and 44 respectively.

Figure 8A:
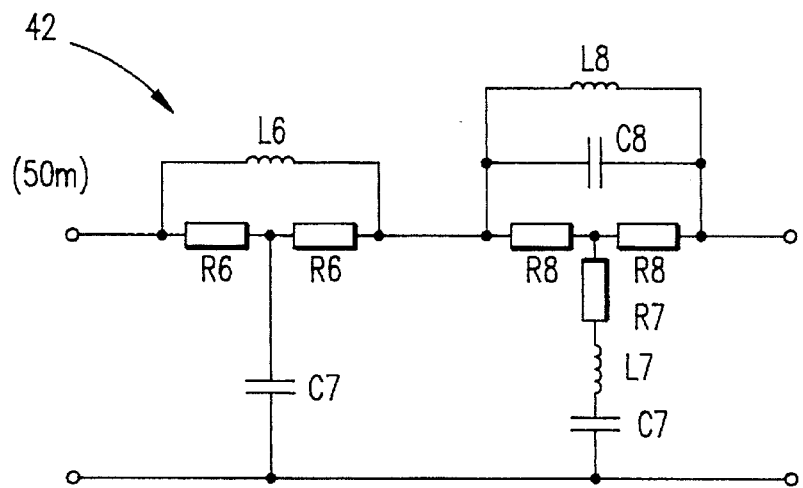
FIG. 8 shows the networks for the additional stages shown in FIG. 6.
Figure 8B:
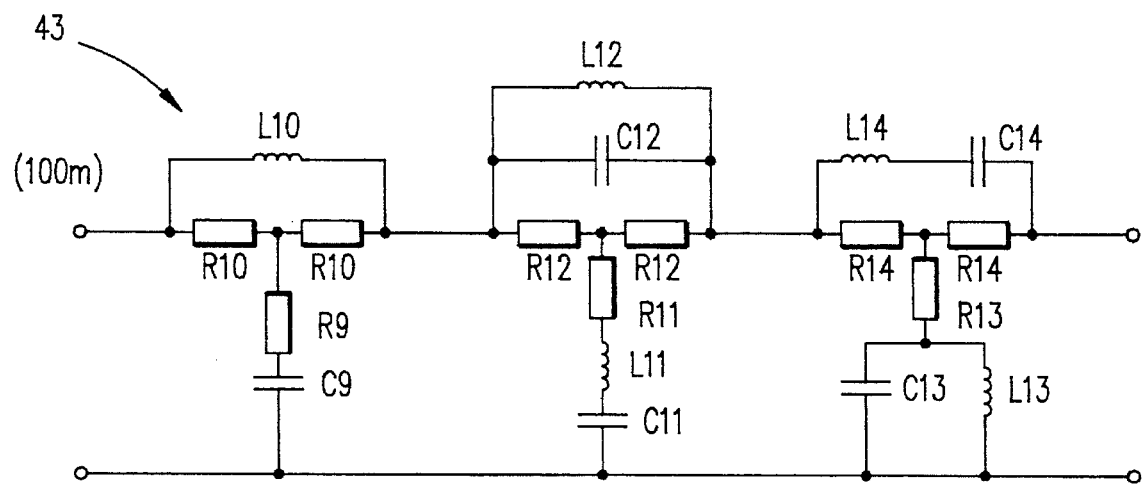
Figure 8C:
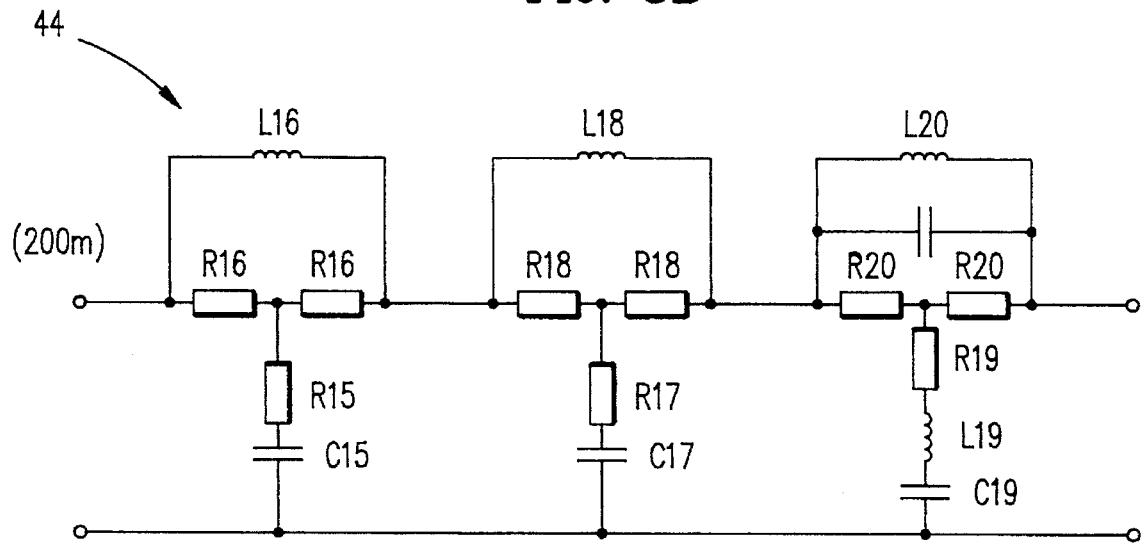

Network 42 emulates 50 meters of coaxial cable and has a similar network topology to network 41 as shown in FIG. 8. Resistors R6, R7 and 8 are similarly configured to resistors R2, R3 and R4 and have values of 43 ohms, 270 ohms and 9.1 ohms respectively. Capacitors C5, C7 and C8 are similarly configured as capacitors C1, C3 and C4 and have values of 11.94 pF, 42.91 pF and 36.98 pF respectively. Similarly, inductors L6, L7 and L8 are similarly configured as inductors L2, L3 and L4 and have values of 67.18 nH, 208 nH and 241.4 nH respectively.

Network 43 is arranged to introduce an attenuation and group delay equivalent to that introduced by 100 meters of coaxial cable. The network consists of serially connected balanced resistor pairs R10, R12 and R14 of 39 ohms, 22 ohms and 7.5 ohms respectively. An inductor L10 is placed in parallel with both resistors R10 and has an inductance of 240.2 nH. A serially connected resistor R9 of 47 ohms and a capacitor C9 of 42.71 pF bridge the mutual connection between resistors R10 to ground.

An inductor L12 of 13.18 nH and a capacitor C12 of 11.89 pF are connected both in parallel with the serially connected resistors R12. A bridge between the mutual connection of resistors R12 to ground is formed by a resistor R11 of 120 ohms, an inductor L11 of 66.86 nH and a capacitor C11 of 2.342 pF.

An inductor L14 of 17.03 nH and a capacitor C14 of 145.5 pF are connected in series and said series connection in connected in parallel with resistors R14. A capacitor C13 of 3.027 pF and an inductor L13 of 818.2 nH are connected in parallel. Said parallel connection is in turn connected in series with a resistor R13 of 390 ohms and said series connection bridges the mutual connection of resistors R14 to ground.

Network 44 emulates a 200 meters length of coaxial cable, introducing an attenuation of approximately 20 decibel with a group delay equivalent to that of the coaxial cable, over the frequency range of interest from 10 megahertz to 300 megahertz.

Resistor pairs R16, R18 and R20 are connected in series and have resistance values of 43 ohms, 33 ohms and 51 ohms respectively. An inductor L16 of 110.1 nH is connected in parallel with the serially connected resistors R16. A resistor R15 of 43 ohms is connected in series with the capacitor C15 of 19.57 pF and said serial connection connects the mutual connection of resistors R16 to ground.

An inductor L18 of 388.2 nH is connected in parallel with resistor pair R18. A resistor R17 of 75 ohms is connected in series with a capacitor C17 of 69.01 pF and this serial combination connects the mutual connection of resistors R18 to ground.

The mutual connection of resistors R20 are connected to ground via a serial network consisting of a resistor R19 of 27 ohms, an inductor L19 of 11.58 nH and a capacitor C19 of 11.35 pF. An inductor L20 of 63.83 nH is connected in parallel with resistors R20 and a capacitor C20 of 2.05 pF.

The network sections are fabricated on a circuit board of FR4 material and conductive tracks are laid down using microstrip design principles, to give a good transmission bandwidth up to several hundred megahertz. Copper tracks are covered with a deposit of solder and good ground planing should be achieved during construction.

All resistors are of the 0805 size of the type configured within a resistive layer covering a substrate and providing a tolerance of one percent.

NPO capacitors are employed, with a tolerance of plus or minus one half pF for values below ten pF and one percent for those above ten pF, again using the 0805 casing size.

Inductors are individually made by winding enamel coated copper wire around toroidal formers, as is known in the art. Data sheets are available which specify the number of turns required for a particular inductance, whereafter the actual inductance of the inductor is measured using an impedance analyser and modifications are made where necessary.

The completed circuit board is mounted in a conductive housing, preferably by soldering a copper braid to the housing, wherein said copper braid has previously been soldered to the circuit board itself using high melting point solder. The circuit is then encapsulated, so as to hold all of the components securely in position.

Figure 9:
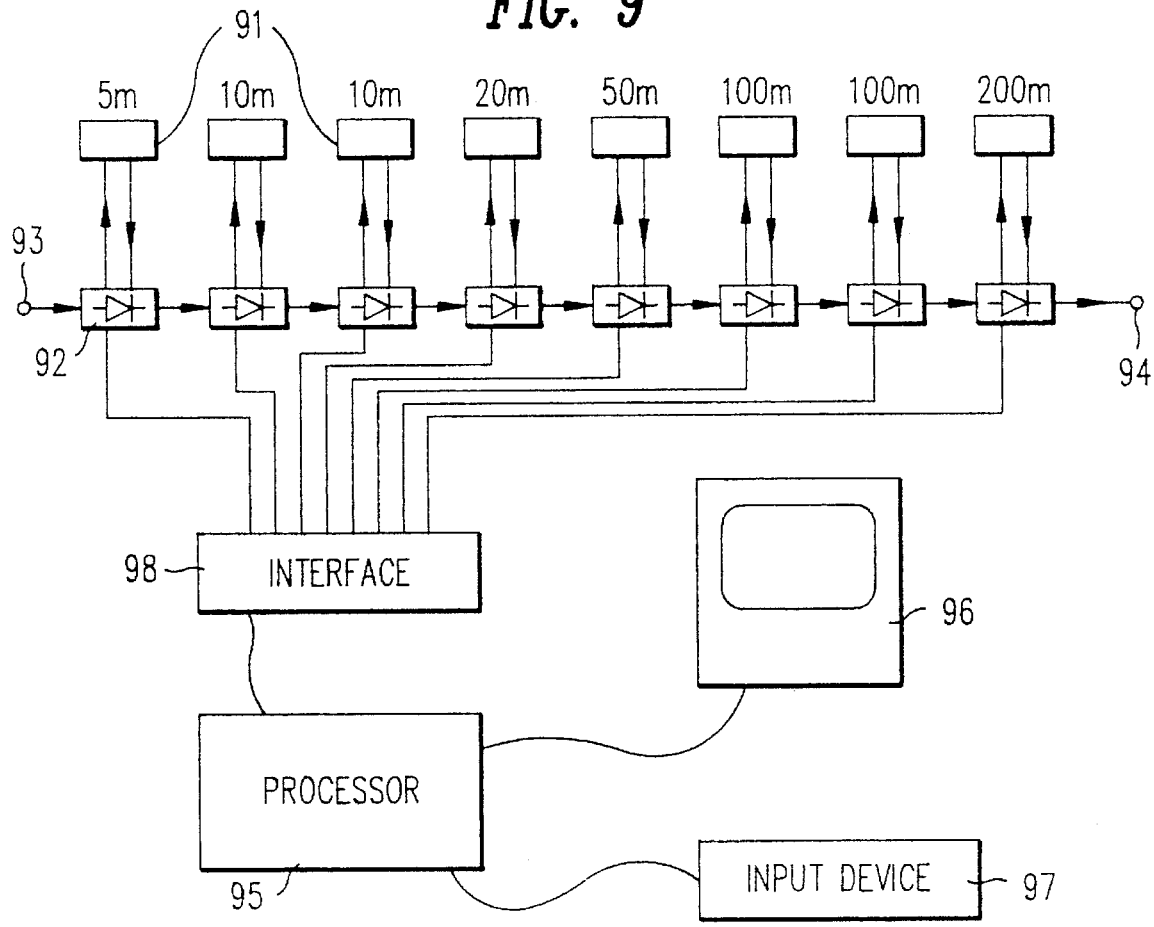
FIG. 9 shows an automated testing cascade.

A third embodiment is shown in FIG. 9, in which a plurality of network sections 91 may be selectively connected in cascade, in response to control signals from an automated control processor.

In the embodiment shown in FIG. 9, 8 network sections are present, arranged to emulate cable lengths of 5 meters, 10 meters, 10 meters, 20 meters, 50 meters, 100 meters, 100 meters and 200 meters. Connection of the network sections into the cascade is achieved by a respective relay 92. Each relay includes a light emitting diode which is illuminated when its associated network section has been connected to the cascade.

A test signal is applied to an input port 93 and the attenuated signal is received at an output port 94.

The control processor consists of a standard purpose programmable processor 95, arranged to display output data on a monitor 96 and to receive input data from an input device 97. Instructions to connect sections into the cascade are supplied to an interface unit 98, which in turn is arranged to operate selected relays 92.

Circuits for the 50 meters, 100 meters and 200 meters sections 91 are substantially similar to 42, 43, and 44 shown in FIG. 6, although it is preferable to use components with tighter tolerances, allowing extremely accurate measurements to be made.

The 20 meters section uses a circuit topology similar to section 41, with suitably modified component values. However, the 5 meters and 10 meters sections are difficult to implement using the previously described topologies, due to parasitic effects.

Figure 10:
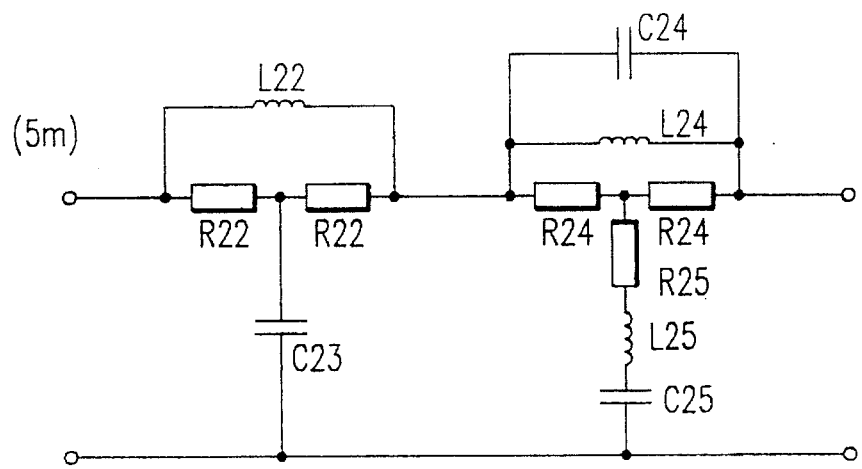
FIG. 10 snows an additional network for the cascade shown in FIG. 9.

A suitable topology for a 5 meters section is shown in FIG. 10, in which a pair of resistors R22, each of 75 ohms, are serially connected to a series pair of resistors R24 of 0.8 ohms. An inductor L22 of 10.11 nH is connected in parallel with the resistor pair R22 and a capacitor C23 of 1.798 pF connects the mutual connection between resistors R22 to ground.

A capacitor C24 of 228 pF is connected in parallel with an inductor L24 of 22.4 nH, both of which are in parallel with the resistor pairs R24. A resistor R25 of 3300 ohms is connected in series with an inductor L25 of 1280 nH and a capacitor C25 of 3.97 pF. These serially connected components connect the mutual connection between resistors R24 to ground.

In the embodiments described, the network is usable as a hand held test device, for use in the field, or as a bench mountable device, for accurate testing under laboratory conditions. In an alternative embodiment, a switchable device is included as part of another piece of equipment, usually operated with the network out of circuit. The network could emulate 50 meters of cable, say, and a switch operated to place the network in series with the output of the equipment. If, with the network in circuit, uncorrupted transmission is still possible, an operator knows that sufficient head room is available for the output cable to be extended by a further 50 meters.

Thus, for example, the network could be included as part of equipment used for processing digital video signals. It would be included as part of the equipment's serial digital output interface and each time the system is reconfigured, the network could be brought into circuit to determine whether the cable could still be extended by a further 50 meters.

The preferred circuits described herein are implemented using passive networks. This has an advantage, particularly with hand held units, in that it is not necessary to provide a power supply. The device can be built into a robust casing, without the need for providing manual access. However, in alternative embodiments, the network could be configured from active circuits, again arranged to emulate the transmission characteristics of cable over a frequency range of interest.

We claim:

1. An electrical network for emulating the electrical characteristics of co-axial transmission cable when transmitting serial digital video signals, the network comprising:

an input terminal for receiving said serial digital video signals having input frequencies;

an output terminal for conveying modified serial digital video signals;

a ground terminal;

a plurality of filter circuits, wherein each filter circuit comprises:

a pair of resistors coupled in series between the input and output terminals, wherein an interconnection point exists between the resistors;

an inductor coupled in parallel with the pair of resistors; and a bridge circuit coupled between the interconnection point and said ground terminal;

wherein the bridge circuit of at least one of the filter circuits includes an inductor, a capacitor and a resistor connected in series between the interconnection point and said ground terminal, the filter circuits being constructed to have a frequency response which emulates the frequency response of a predetermined length of the co-axial transmission cable over a frequency range suitable for transmitting the serial digital video signals.

2. A network according to claim 1, wherein the filter circuits are constructed to have a frequency response with an attenuation level substantially proportional to one over the square root of the input frequencies.

3. A network according to claim 1, wherein the filter circuits consist only of passive resistors, capacitors and inductors.

4. A network according to claim 1 wherein the filter circuits are constructed to have a frequency response which emulates the frequency response of a predetermined length of the coaxial transmission cable over a frequency range of 10 MHz to 150 MHz.

5. A network according to claim 1 further comprising:

a plurality of filter sections, each comprising a plurality of the filter circuits, wherein each filter section includes a filter circuit having a bridge circuit which includes an inductor, a capacitor and an inductor connected in series between the interconnection point of the filter circuit and said ground terminal, and wherein each filter section has a frequency response that emulates the frequency response of a different predetermined length of the coaxial transmission cable over a frequency range suitable for transmitting the serial digital video signals; and means for connecting one or more of the filter sections in cascade between the input terminal and the output terminal.

6. A network according to claim 5, wherein the electrical network consists of six filter sections.

7. A network according to claim 5, wherein the electrical network consists of four filter sections.

8. A network according to claim 7 wherein the four filter sections include a first filter section that emulates the frequency response of a coaxial transmission cable having a length of 25 meters, a second filter section that emulates the frequency response of a coaxial transmission cable having a length of 50 meters, a third filter section that emulates the frequency response of a coaxial transmission cable having a length of 100 meters, and a fourth filter section that emulates the frequency response of a coaxial transmission cable having a length of 200 meters.

9. A network according to claim 5, wherein the means for connecting is manually operated.

10. A network according to claim 5 wherein the means for connecting comprises a relay.

11. A network according to claim 5, wherein the means for connecting comprises a plurality of switches coupled to the filter sections, wherein the switches allow any combination of the filter sections to be connected between the input and output terminals.

12. The network according to claim 1, wherein the bridge circuit of at least one of the filter circuits consists of a capacitor connected between the interconnection point and the ground terminal.

13. The network according to claim 1, wherein the bridge circuit of at least one of the filter circuits consists of a resistor and a capacitor connected in series between the interconnection point and the ground terminal.

14. The network according to claim 1, wherein the filter circuit which includes the bridge circuit having the series connected inductor, capacitor and resistor further comprises a capacitor coupled in parallel with the pair of resistors of the filter circuit.

15. The network according to claim 1, wherein the bridge circuit of at least one of the filter circuits comprises a resistor connected in series with a parallel combination of a capacitor and an inductor.

16. The network according to claim 15, wherein the filter circuit which includes the bridge circuit having the series connected resistor and parallel connected capacitor and inductor further comprises a capacitor coupled in series with the inductor which is coupled in parallel with the pair of resistors of the filter circuit.

17. The network according to claim 1, wherein the input terminal comprises a coaxial cable connector.

18. The network according to claim 17, wherein the output terminal comprises a coaxial cable connector.

19. A method of testing the amount of degradation in a serial digital video signal caused by transmission over a length of an electrical transmission cable, the method comprising the steps of:

providing a plurality of filter sections, each configured to emulate the response of a predetermined length of coaxial transmission cable to serial digital video signals, wherein each filter section comprises a plurality of filter circuits, each filter circuit comprising at least an inductor, a capacitor and a pair of series-connected resistors;

selectively coupling one or more of the filter sections in cascade to create test circuit which emulates the length of the electrical transmission cable;

connecting the test circuit in series with existing cable;

applying a serial digital video signal to the test circuit; and assessing the level of degradation of the serial digital video signal introduced by the test circuit.

* * * * *

UNITED STATES PATENT AND TRADEMARK OFFICE
CERTIFICATE OF CORRECTION

PATENT NO. : 5,576,756
DATED : November 19, 1996
INVENTOR(S) : David C. Baty and Barry D. R. Miles It is certified that error appears in the above-indentified patent and that said Letters Patent is hereby corrected as shown below:

Title page, item [54] and column 1, line 2, change "OR" to --OF--.

Signed and Sealed this

Thirteenth Day of May, 1997

*Attest:*

BRUCE LEHMAN

*Attesting Officer*     *Commissioner of Patents and Trademarks*